United States Patent [19]

Kretschmer et al.

[11] Patent Number: 4,772,987

[45] Date of Patent: Sep. 20, 1988

[54] HEADLIGHT FOR ANTIFOG LAMP FOR AUTOMOTIVE VEHICLES

[75] Inventors: Heinz Kretschmer, Bönnigheim; Gerhard Lindae, Leonberg; Ernst Merkl; Peter Perthus, both of Stuttgart, all of Fed. Rep. of Germany

[73] Assignee: Robert Bosch GmbH, Stuttgart, Fed. Rep. of Germany

[21] Appl. No.: 862,308

[22] Filed: May 8, 1986

[30] Foreign Application Priority Data

Jul. 13, 1985 [DE] Fed. Rep. of Germany ....... 3525041

[51] Int. Cl.$^4$ ................................................ B60Q 1/00

[52] U.S. Cl. ...................................... 362/61; 362/297; 362/215; 362/343; 362/346

[58] Field of Search ................. 362/61, 341, 343, 346, 362/347, 257, 267, 296, 297, 309, 215

[56] References Cited

U.S. PATENT DOCUMENTS

| | | | |
|---|---|---|---|
| 2,074,626 | 3/1937 | Strange | 362/346 X |
| 4,149,229 | 4/1979 | Draper | 362/346 X |
| 4,669,032 | 5/1987 | Lietar et al. | 362/61 |

FOREIGN PATENT DOCUMENTS

| | | | |
|---|---|---|---|
| 2425336 | 12/1974 | Fed. Rep. of Germany . | |
| 3218703 | 11/1983 | Fed. Rep. of Germany . | |
| 2102934 | 2/1983 | United Kingdom | 362/61 |

*Primary Examiner*—Margaret A. Focarino
*Attorney, Agent, or Firm*—Michael J. Striker

[57] ABSTRACT

In a headlight for antidazzle lamps for motor vehicles, a reflector and a shield or screen, and an objective form a light beam illuminating a roadway in accordance with law requirements. The lower portion of the reflector forms a paraboloid-ellipsoid-shaped section which generates an additional light beam below the screen and the objective. The additional light beam is received by horizontal scattering prisms on a transparent pane.

6 Claims, 1 Drawing Sheet

HEADLIGHT FOR ANTIFOG LAMP FOR AUTOMOTIVE VEHICLES

BACKGROUND OF THE INVENTION

The present invention pertains to a headlight of an antidazzle or anti-fog lamp for a motor vehicle.

Headlights of the foregoing type normally include a reflector accommodating a glowing lamp and an objective through which light beams from the lamp pass. The illumination of the tarmac, which is the region of the roadway before the vehicle, and two edges of the roadway, is obtained by an additional light beam whereby an improvement in a side orientation for a driver is achieved.

One of the known headlights of the type under discussion is disclosed in DE-OS No. 24 25 336. In this known headlights two-side reflectors and one objective are required in order to form an additional light beam. The adjustment of the side reflectors and the overlapping of the main light baam by the additional light beam have been always connected with high mechanical and optical expenses.

Also known is a headlight disclosed in DE No. 32 18 703 Al, in which in order to generate an additional light beam, only direct rays, e.g. non-reflected by the reflector, have been utilized. These direct rays pass through two prismatic discs positioned laterally of the objective; the light intensity of the direct rays has been, however, insufficient, and the horizontal extension of both prismatic discs wnich is many times longer than that of the objective has increased the side extension of the headlight.

SUMMARY OF THE INVENTION

It is an object of the present invention to provide an improved headlight for antidazzle and anti-fog lamps for motor vehicles.

It is another object of the invention to provide a headlight in which technical and optical inadequacies of conventional headlights will be eliminated.

These and other objects of the present invention are attained by a headlight for an antidazzle or anti-fog lamp for motor vehicles, comprising a light source; a reflector reflecting light rays from the light source, said reflector having a vertical and a horizontal meridian portions formed by curves of high order; a shield positioned in a path of rays reflected by said reflector for forming a twilight limit of a light beam; an objective positioned in the path of rays passing said shield for forming the light beam transmitted to a roadway; and optical means for generating an additional light beam adjacent to said light beam, said optical means being positioned in at least lower and upper region of said reflector and adapted to reflect only the light beams which are inefficient for forming the first mentioned light beam.

Said optical means may be at least one portion of said reflector in a lower region thereof. Thus the certain area of the reflector is drawn for the formation of the additional light beam, the reflected rays of which are screened by the shield.

Said portion of the reflector may be formed as a portion of paraboloid. Thereby the optical means which is easy to manufacture is provided.

Said portion of the reflector may be comprised of at least one left-hand section and one right-hand section, an optical axis of the left-hand section being pivotable to the right and an optical axis of the right-hand section being pivotable to the left about a vertical pivot axis which extends through said light source. Thereby left-hand and right-hand edges of can be adequately illuminated.

Said portion of the reflector may be a portion of a paraboloid-elipsoid which has a vertical meridian section of paraboloid and a horizontal meridian section of elipsoid. The additional light beam is formed by a reflection section.

The additional light beam illuminates the area of the roadway close to the vehicle, and also two edges of the roadway and transmits to a driver a signal image to which he or she is accustomed when customary headlights with paraboloid reflectors are utilized.

The headlight may further include horizontal scattering means positioned in a path of rays of said additional light beam.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompany drawing.

DETAILED DESCRIPTION OF THE PREFERRED EMBODIMENTS

Figure 1:
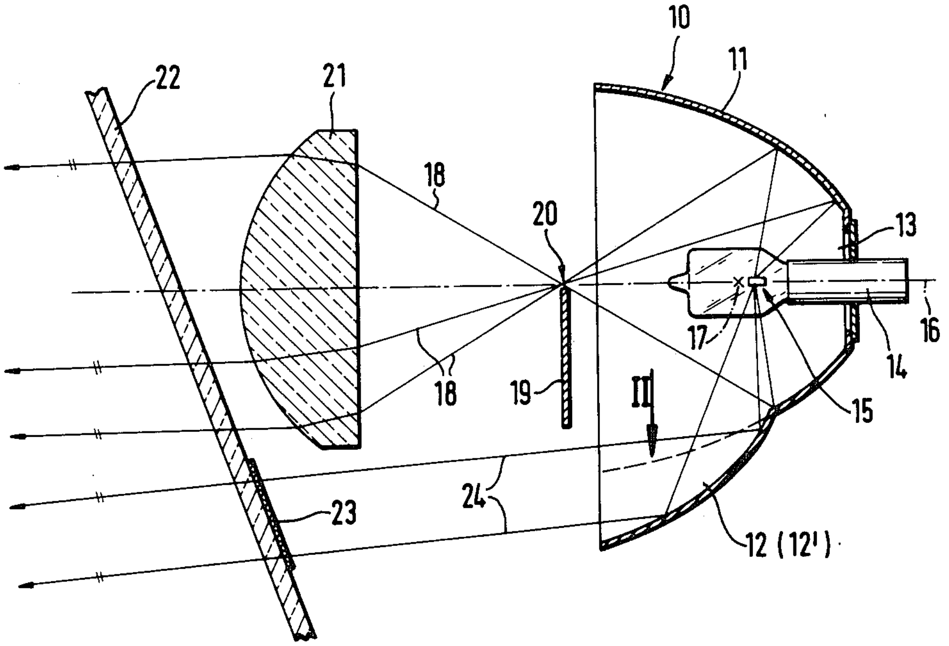
FIG. 1 is a schematic sectional view of a headlight for antidazzle or antifog lamps for automotive vehicles.

Referring now to the drawings in detail it will be seen that a headlight for antidazzle and anti-fog lamps of automotive vehicles comprises a complete reflector 10 which is formed substantially by a reflector 11 and a reflector portion 12. The vertical and horizontal meridian portions of reflector 11 are curves of a higher order, particularly ellipses or parabolas.

A glowing lamp 14 is inserted in an apex opening 13 of reflector 11. An incandescent filament (a light source) 15 of this lamp is positioned in the region of the optical axis 16 of the headlight. This incandescent filament is slightly displaced relative to a focus point 17 of the reflector portion 12. The reflector portion 12 is the portion of paraboloid and is attached to reflector 11 in the lower region of the complete reflector 10.

In the path of rays 18 reflected by reflector ll, is arranged, below the axis 16, a diaphragm or shield 19, the edge 20 of which forms a twilight limit of the light beam of the antidazzle or anti-fog lamp which illuminates a roadway. An objective 21 is positioned in the path of rays passing the shield 19 and before the latter. Objective 21 projects light onto the roadway.

In the path of rays before the objective 21, is arranged a transparent pane 22, the inclination and a sweepback (lateral inclination) of which substantially define a front end of the vehicle body. In the lower region and at the inner side of the transparent pane 22, are provided horizontal scattering means, for example prisms 23.

Three light rays 18 reflected by reflector 11 pass through objective 21 and form a light beam which meets law requirements to illuminate a roadway.

The reflector portion 12, formed as a portion of the paraboloid, reflects rays 24 below the diaphragm 19 and objective 21 whereby an additional light beam 24 is formed, which illuminate not only a tarmac but also cause a side illumination, that is illumination of the edges of the roadway. Light rays 24 are non-effective for forming the aforementioned light beam which passes through the objective 21.

In an alternative case, horizontally-scattering means 23 are not required when the reflector portion 12' is a portion of a paraboloid-ellipsoid, the vertical meridian part of which is parabola, and the horizontal meridian part of which is ellipsoid because a desired side illumination is obtained thereby.

Figure 2:
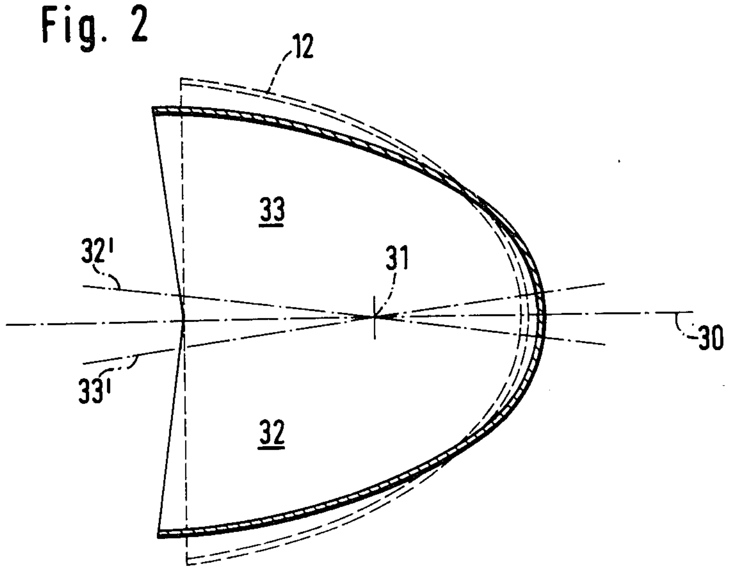
FIG. 2 is a modified structure of a reflection portion generating an additional light beam, as viewed in the direction II of FIG. 1, on an enlarged scale.

With reference to FIG. 2 it will be seen that the reflector portion is comprised of a left-hand part 32 and a right-hand part 33 as viewed in the direction of line II of FIG. 1. The original reflector portion 12 shown by dash-dotted line is divided by a vertical central plane 30 into the left-hand side part 32 and the right-hand side part 33; both side parts or sections are pivotable about a vertical pivot axis 31 which passes through the light source 15 (FIG. 1) so that an optical axis 32' of the left-hand side section 32 pivots towards the right while the optical axis 33' of the right-hand section 33 pivots towards the left relative to the vertical central plane 30.

It will be understood that each of the elements described above, or two or more together, may also find a useful application in order types of headlights for automotive vehicles differing from the types described above.

While the invention has been illustrated and described as embodied in a headlight for antidazzle lamps of automotive vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight for an antidazzle or anti-fog lamp for motor vehicles, comprising a light source; a reflector reflecting light rays from the light source, said reflector having a vertical and a horizontal meridian portions formed by curves of high order; a shield positioned in a path of rays reflected by said reflector for forming a twilight limit of a light beam; an objective positioned in the path of rays passing said shield for forming the light beam transmitted to a roadway; an optical means for generating an additional light beam adjacent to the first mentioned light beam, said optical means being positioned in a lower region of said reflector and reflecting only the light rays which are inefficient for forming the first mentioned light beam.

2. The headlight as defined in claim 1, wherein said optical means is at least one portion of said reflector in the lower region thereof.

3. The headlight as defined in claim 2, wherein said portion of said reflector is a portion of a paraboloid.

4. The headlight as defined in claim 2, wherein said portion of said reflector is comprised of at least one left-hand section and one right-hand section as viewed in a plan view of said portion in a direction towards said objective relative to a vertical axis which extends through said light source, an optical axis of the left-hand section being pivotable to the right and an optical axis of the right-hand section being pivotable to the left about said vertical axis.

5. The headlight as defined in claim 4, wherein said portion of said reflector is a portion of a paraboloid-ellipsoid which has a vertical meridian section of paraboloid and a horizontal meridian section of ellipsoid.

6. The headlight as defined in claim 1, further including horizontal scattering means positioned in a path of rays of said additional light beam.

* * * * *